US011289964B2

(12) United States Patent
Mancuso et al.

(10) Patent No.: US 11,289,964 B2
(45) Date of Patent: Mar. 29, 2022

(54) GENERATOR FIELD AMORTISSEUR AND SPRING AXIAL LOCKING MECHANISM

(71) Applicant: General Electric Company, Schenectady, NY (US)

(72) Inventors: Benjamin A. Mancuso, Schenectady, NY (US); Curtis M. Hebert, Schenectady, NY (US); Scott Eric Belknap, Johnstown, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 245 days.

(21) Appl. No.: 16/398,642

(22) Filed: Apr. 30, 2019

(65) Prior Publication Data

US 2020/0350795 A1 Nov. 5, 2020

(51) Int. Cl.
*H02K 1/30* (2006.01)
*H02K 3/16* (2006.01)
*H02K 3/52* (2006.01)
*H02K 3/42* (2006.01)
*H02K 3/487* (2006.01)

(52) U.S. Cl.
CPC ............... *H02K 1/30* (2013.01); *H02K 3/16* (2013.01); *H02K 3/527* (2013.01); *H02K 3/42* (2013.01); *H02K 3/487* (2013.01); *Y02E 20/16* (2013.01)

(58) Field of Classification Search
CPC .......... H02K 1/30; H02K 3/16; H02K 3/527; H02K 3/42; H02K 3/487; Y02E 20/16
USPC ...................................................... 310/261.1
See application file for complete search history.

(56) References Cited

U.S. PATENT DOCUMENTS

| 3,212,531 | A | * | 10/1965 | Hinds | ............... | H02K 15/0435 |
| | | | | | | 140/71 R |
| 4,363,986 | A | * | 12/1982 | Joho | ....................... | H02K 7/04 |
| | | | | | | 310/194 |
| 5,113,114 | A | * | 5/1992 | Shih | ........................ | H02K 3/51 |
| | | | | | | 310/214 |
| 5,118,979 | A | * | 6/1992 | Shih | ........................ | H02K 3/51 |
| | | | | | | 310/214 |
| 5,122,698 | A | * | 6/1992 | Walker | ..................... | H02K 3/16 |
| | | | | | | 310/214 |
| 5,550,417 | A | | 8/1996 | Morrison et al. | | |
| 5,708,315 | A | * | 1/1998 | Gould | ..................... | H02K 3/40 |
| | | | | | | 310/180 |
| 6,252,328 | B1 | | 6/2001 | Brem et al. | | |

(Continued)

FOREIGN PATENT DOCUMENTS

| EP | 0 952 655 A2 | 10/1999 |
| EP | 0 952 655 A3 | 1/2002 |
| FR | 939908 A | 11/1948 |

OTHER PUBLICATIONS

European Search Report for EP 20171436.7, dated Sep. 23, 2020 (8 pp.).

(Continued)

*Primary Examiner* — Alex W Mok
(74) *Attorney, Agent, or Firm* — Eversheds Sutherland (US) LLP

(57) ABSTRACT

The present application provides an amortisseur-spring assembly for use about at least one of a wedge and a retaining ring of a generator. The amortisseur-spring assembly may include an amortisseur, a spring, a creepage block, and a locking mechanism extending through the amortisseur, the spring, and the creepage block.

20 Claims, 6 Drawing Sheets

(56) References Cited

U.S. PATENT DOCUMENTS

| | | | |
|---|---|---|---|
| 9,059,613 B2* | 6/2015 | Rigosu, Jr | H02K 3/16 |
| 2013/0221797 A1 | 8/2013 | Rigosu, Jr. et al. | |
| 2016/0069202 A1* | 3/2016 | Shinde | F01D 11/005 |
| | | | 277/640 |
| 2016/0352177 A1 | 12/2016 | Adam et al. | |
| 2016/0359385 A1 | 12/2016 | Buskirk et al. | |
| 2016/0380520 A1 | 12/2016 | Word et al. | |
| 2018/0301860 A1 | 10/2018 | Scalzo, III et al. | |
| 2018/0301962 A1 | 10/2018 | Scalzo, III et al. | |

OTHER PUBLICATIONS

GE Static Start Spring/Slot Amortisseur Migration, AGT Services (1 p.).

7FH2 and 324 Model Generator Issues, AGT Services, http://www.aglservices.com/7FH2-and-324-generator-issues, Mar. 20, 2019 (2 pp.).

* cited by examiner

GENERATOR FIELD AMORTISSEUR AND SPRING AXIAL LOCKING MECHANISM

TECHNICAL FIELD

The present application and the resultant patent relate generally to electrical generators and more particularly relate to electrical generators used in combined cycle systems and the like with a locking mechanism for an amortisseur-spring assembly to prevent component migration.

BACKGROUND OF THE INVENTION

Generator fields may have an amortisseur system designed to conduct unintended rotor surface currents. Such rotor surface currents may be generated during motored startup, normal operation, and abnormal operation. The amortisseur system may be an assembly of thin metallic conductive parts positioned in the rotor wedge dovetail. Amortisseur systems designed for static starts (i.e., motored starts) also may have a spring to provide positive contact during low speed operation. These components may migrate axially over long term cyclic (start and thermal) operations. Such migration may result in blocked ventilation and/or electrical ground faults in service, i.e., the electrical insulation to the charged windings may become compromised. Given such, axial retention of the components of an amortisseur system may promote long term reliability and performance.

SUMMARY OF THE INVENTION

The present application and the resultant patent thus provide an amortisseur-spring assembly for use about at least one of a wedge and a retaining ring of a generator. The amortisseur-spring assembly may include an amortisseur, a spring, a creepage block, and a locking mechanism extending through the amortisseur, the spring, and the creepage block.

The present application and the resultant patent further provide a method of installing an amortisseur-spring assembly in a generator. The method may include the steps of creating an aperture through an amortisseur, a spring, and a creepage block of the amortisseur-spring assembly, inserting a locking mechanism in the aperture, and positioning the amortisseur-spring assembly adjacent to at least one of a wedge and a retaining ring of the generator.

The present application and the resultant patent further provide an amortisseur-spring assembly for use about at least one of a wedge and a retaining ring of a generator. The amortisseur-spring assembly may include an amortisseur, a spring, a creepage block, and a pin extending through the amortisseur, the spring, and the creepage block. The pin may be positioned adjacent to the wedge or the retaining ring.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
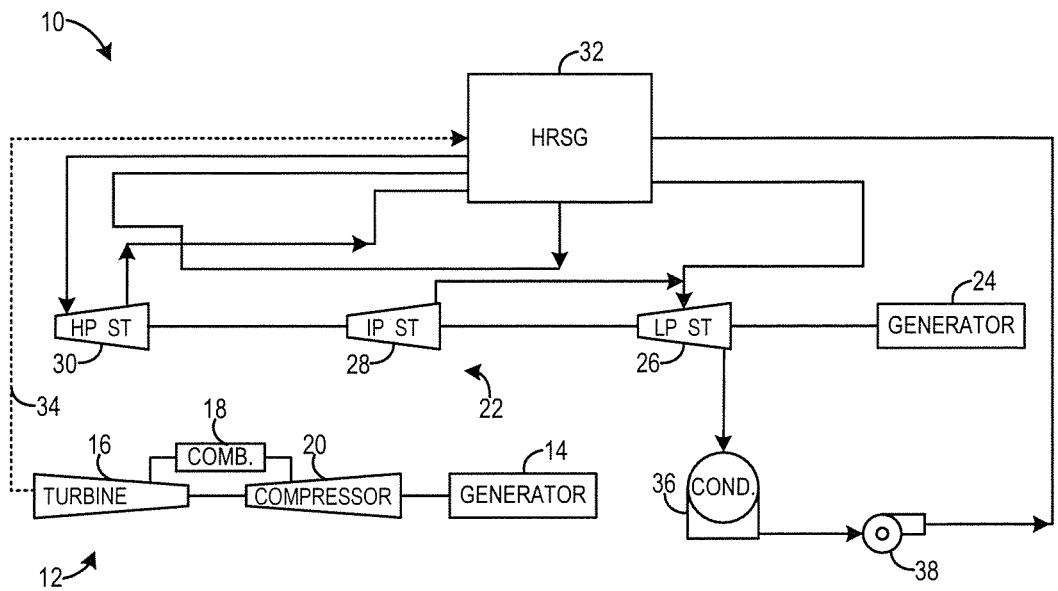
FIG. 1 is a schematic diagram of an exemplary gas turbine combined cycle system as may be described herein.

Referring now to the drawings, in which like numerals refer to like elements throughout the several views, FIG. 1 is a schematic diagram of an exemplary embodiment of a combined cycle power generation system 10. The combined cycle power generation system 10 may include a gas turbine, a steam turbine, and a heat recovery steam generator (HRSG). Specifically, the combined cycle system 10 may include a gas turbine 12 for driving a first generator 14 to produce electrical power. The gas turbine 12 may include a turbine 16, a combustor 18, and a compressor 20. The combined cycle system 10 also may include a steam turbine 22 for driving a second generator 24. The steam turbine 22 may include a low-pressure section 26 (LP ST), an intermediate-pressure section 28 (IP ST), and a high-pressure section 30 (HP ST). Although the gas turbine 12 and the steam turbine 22 may drive separate generators 14 and 24 as is shown herein, the gas turbine 12 and the steam turbine 22 also may be utilized in tandem to drive a single load via a single shaft. The generators and components described herein and the like may be incorporated into other types of power generation systems.

The combined cycle system 10 also may include a multi-stage heat recovery steam generator 32. Heated exhaust gas 34 from the gas turbine 12 may be directed into the heat recovery steam generator 32 to heat the steam used to power the steam turbine 22. Exhaust from the low-pressure section 26 of the steam turbine 22 may be directed into a condenser 36. Condensate from the condenser 36 may, in turn, be directed into a low-pressure section of the heat recovery steam generator 32 with the aid of a condensate pump 38.

Figure 2:
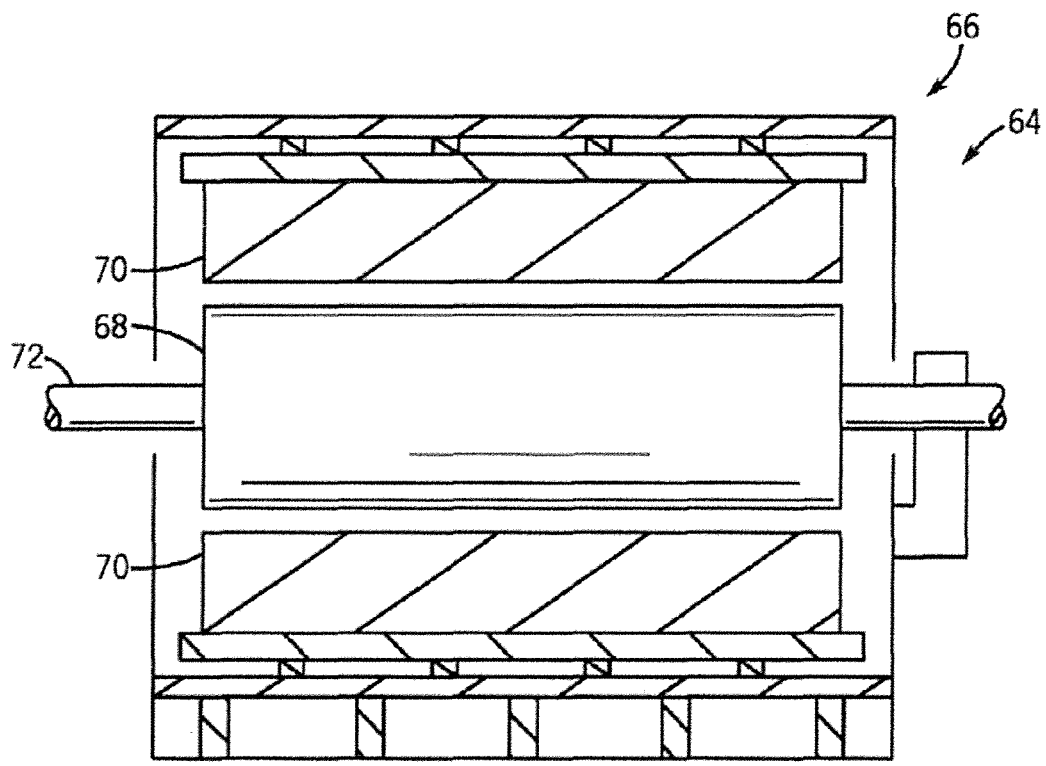
FIG. 2 is a sectional view of an exemplary generator for use in the gas turbine combined cycle system of FIG. 1.

FIG. 2 is a sectional view of an example of a generator 64 that may serve as the generator 14 and/or the generator 24 in the combined cycle power generation system 10 of FIG. 1 or in various other types of power generation systems. The generator 64 may include an annular frame 66, a rotor 68, a stator 70, and a shaft 72. The shaft 72 may be driven to rotate by a gas turbine, a steam turbine, a wind turbine, a hydro turbine, an internal combustion engine, or any other suitable device configured to provide a rotational output. The shaft 72 may be coupled to a substantially cylindrical rotor 68 that may include a wire winding about a magnetic core. The rotor 68 may be disposed within the stator 70, which is configured to provide a stationary magnetic field. Rotation of the rotor 68 within the stator 70 generates electrical current within the wire winding, thereby producing an electrical output from the generator 64. As described above, high cyclic duty of the generator 64 may lead to performance degradations of the generator 64 and the components therein over time.

Figure 3:
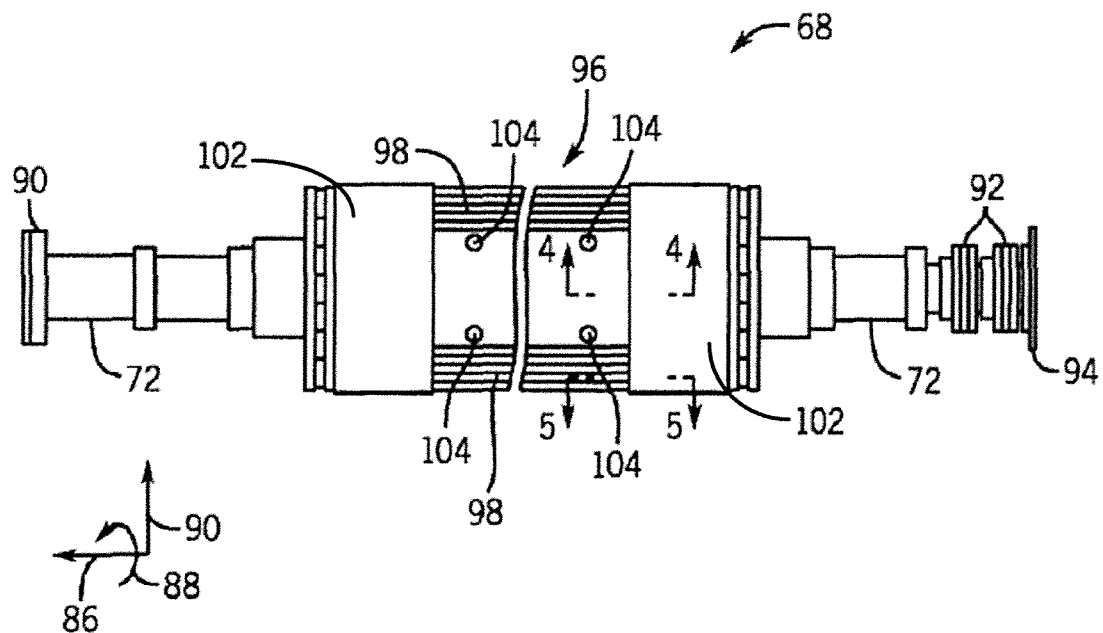
FIG. 3 is a plan view of an exemplary generator rotor of the generator of FIG. 2.

FIG. 3 is a plan view of an embodiment of the generator rotor 68 of the generator 64 of FIG. 2. As is shown, the rotor 68 may include the shaft 72 with a coupling 90, such as a mechanical mode or power turbine coupling, on one end. The shaft extends in an axial direction 86 and rotates the rotor 68 in a circumferential direction 88. Further, the rotor 68 extends out from the shaft 72 in a radial direction 90. On the other end of the shaft 72, there may be collector rings 92 thereon to provide an electrical junction for the rotor field windings. A collector fan 94 may be located adjacent to the collector rings 92. The rotor 68 may have a large diameter body 96 that holds coil windings 98. The coil windings 98 may be disposed in axially oriented 86 slots that extend radially 90 outward from the middle of the rotor 68 to the axial 86 ends of the rotor body 96.

Figure 4:
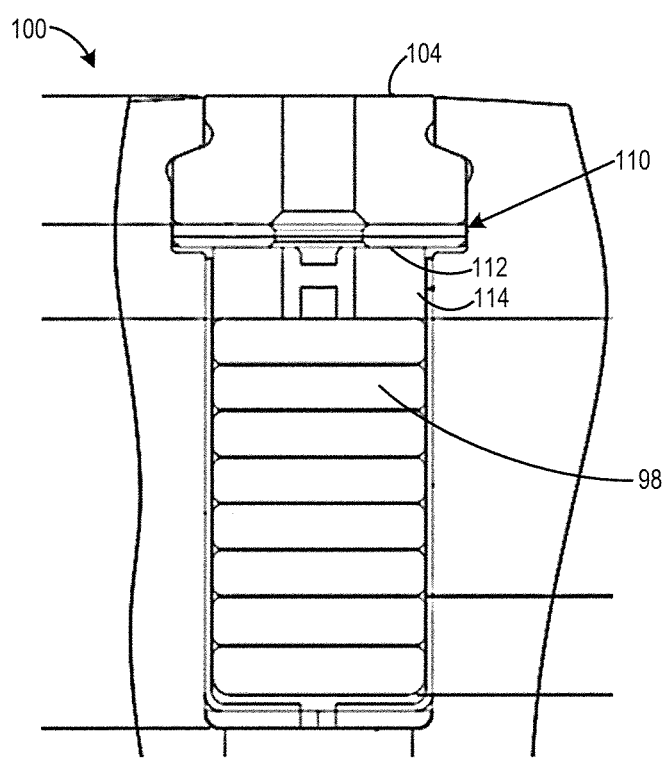
FIG. 4 is partial plan view of an amortisseur system for use with the generator rotor of FIG. 3
Figure 5:
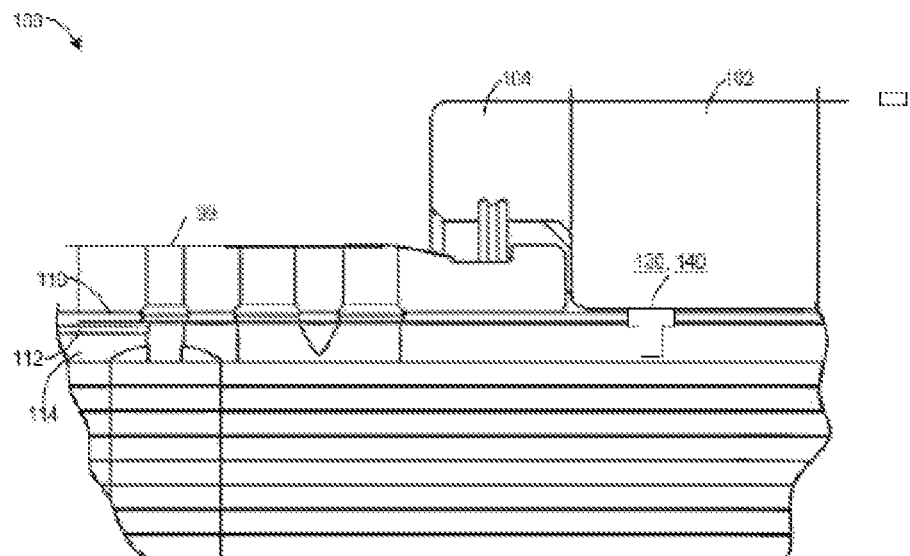
FIG. 5 is a side view of the amortisseur system of FIG. 4.
Figure 6:
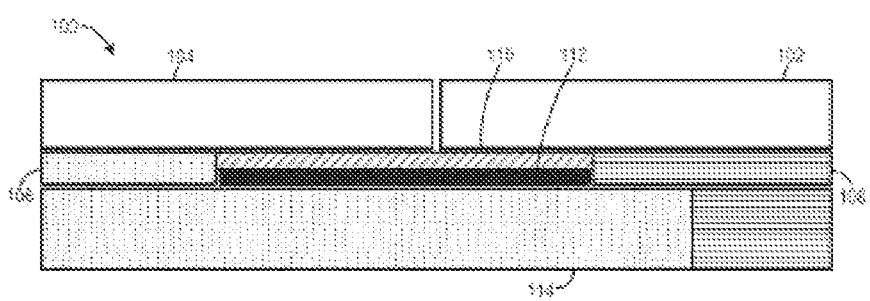
FIG. 6 is a schematic diagram of the amortisseur system of FIG. 4.

FIGS. 4-6 show an amortisseur-spring assembly 100 for use with the rotor 68 and the like. The amortisseur-spring assembly 100 may be positioned between a retaining ring 102 and wedges 104 above the windings 98 of the rotor 68 and between a glass filler 106 and ring insulation 108. The amortisseur-spring assembly 100 may include an amortisseur 110, a spring 112, and a creepage block 114. At turning speed/low speed of the generator 64, the creepage block 114 and the windings 98 may be somewhat loose such that the creepage block 114 may shift axially. At rated speed of the generator 64, all of the components may be compressed radially outward by the developing centrifugal force. As the electrical field is excited and the current is ramped up to rated output, the windings 98 may heat up and expand axially. The components herein thus may slide axially depending upon the relative coefficients of friction until an axial stop is reached.

Figure 7:
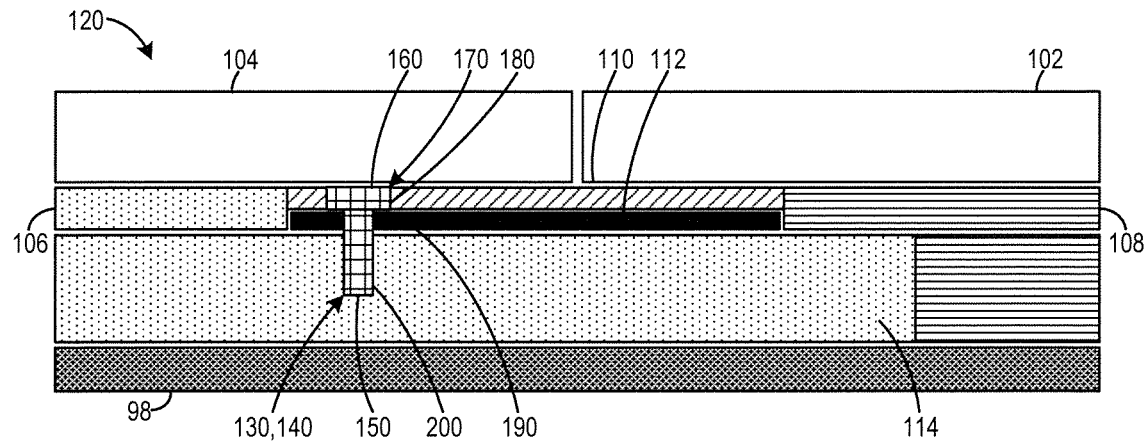
FIG. 7 is a schematic diagram of an amortisseur system as may be described herein.
Figure 8:
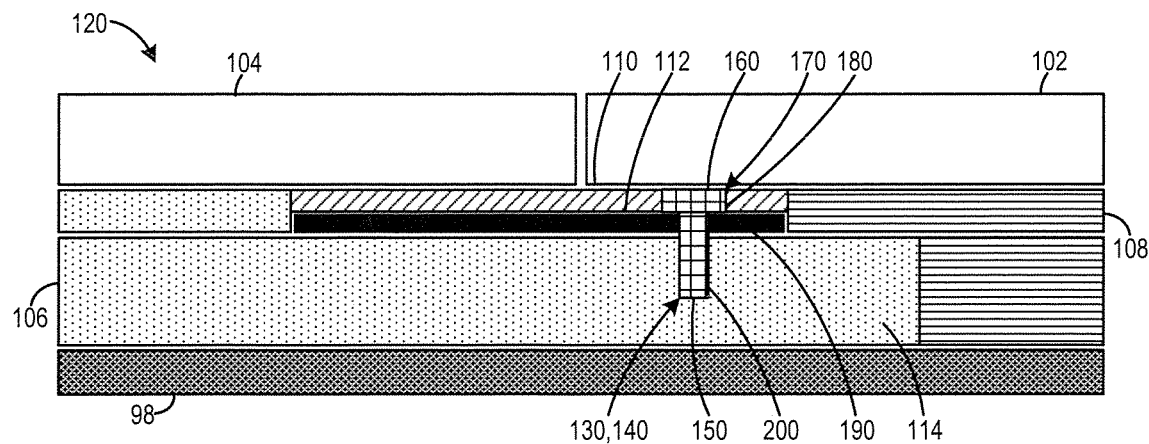
FIG. 8 is a schematic diagram of an alternative embodiment of an amortisseur system as may be described herein.

FIGS. 7 and 8 show examples of an amortisseur-spring assembly 120 as may be described herein. The amortisseur-spring assembly 120 may include the amortisseur 110, the spring 112, and the creepage block 114 as described above. The amortisseur-spring assembly 120 also may include a locking mechanism 130. The locking mechanism 130 may take the form of a pin 140 or other type of mechanical closure. The pin 140 may be made out of a metallic such as steel or a non-metallic such as a glass epoxy and the like. The pin 140 may have a stepped configuration with a shaft 150 and a head 160. The diameter of the head 160 may be greater than the diameter of the shaft 160. The pin 140 may extend through an aperture 170 drilled or otherwise created through each of the components of the amortisseur-spring assembly 100. Specifically, an amortisseur aperture 180, a spring aperture 190, and a creep block aperture 200 may be created. The amortisseur aperture 180 may be larger in diameter than the spring aperture 190 and the creep block aperture 200 given the relative sizes of the shaft 150 and the head 160 of the pin 140. Other components and other configurations may be used herein.

As is shown in FIG. 7, the pin 140 and the aperture 170 may be positioned under the wedges 104. Alternatively as is shown in FIG. 8, the pin 140 and the aperture 170 may be positioned under the retaining ring 102, where it covers the rotor forging. The pin 140 should not be positioned over or adjacent to any of the radial ventilation holes 99 in the components. Rather, the pin 140 and the aperture 170 are located in a previously solid section of the components. Further, instead of the wedges 104 and the retaining ring 102 configuration shown herein, the pin 140 and the aperture 170 may be used under either wedge 104 in a wedge/wedge configuration. Other components and other configurations may be used herein.

The pin 140 axially locks together the amortisseur 110, the spring 112, and the creepage block 114 to prevent relative motion between the components. As is described above, the amortisseur aperture 180 and the diameter of the pin 140 in the amortisseur 110 is larger than that in the spring 112 and creepage block 114. This stepped diameter in the pin 140, along with the wedges 104 being located over the amortisseur 110, acts to radially lock the pin 140 in place. This is significant, because the clearance in the slot, and therefore the radial travel of the creepage block 114, often exceeds the thickness of the amortisseur 110 (and therefore engagement of the pin 140 into the amortisseur 110). Without this radial retention, the pin 140 may disengage from the components while the unit is on turning gear.

Figure 9:
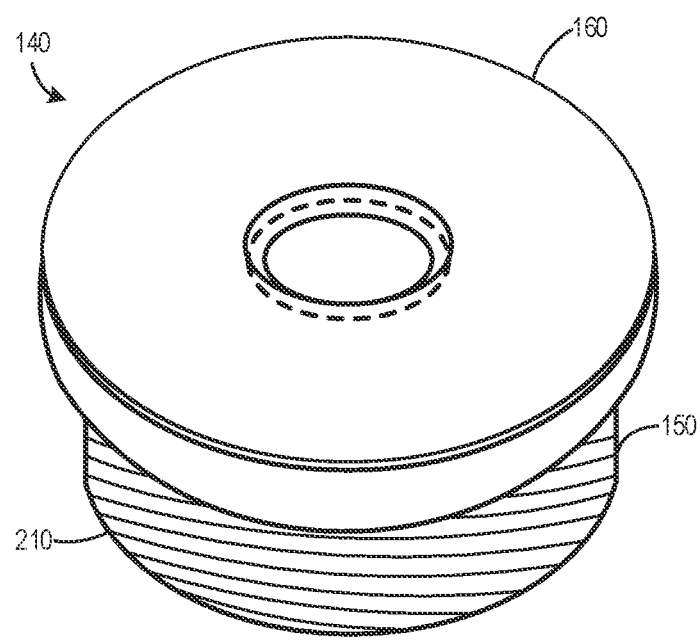
FIG. 9 is a perspective view of a pin for use with the amortisseur systems of FIGS. 7 and 8.
Figure 10:
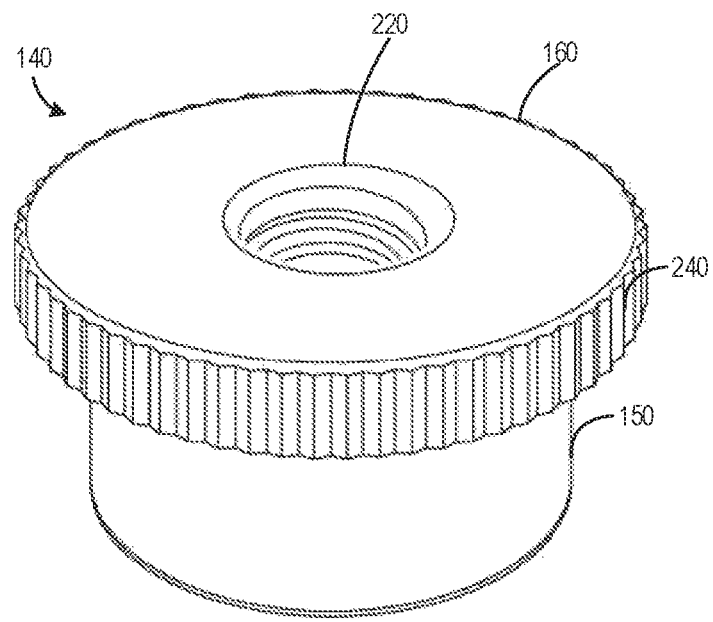
FIG. 10 is a perspective view of an alternative embodiment of a pin for use with the amortisseur systems of FIGS. 7 and 8.
Figure 11:
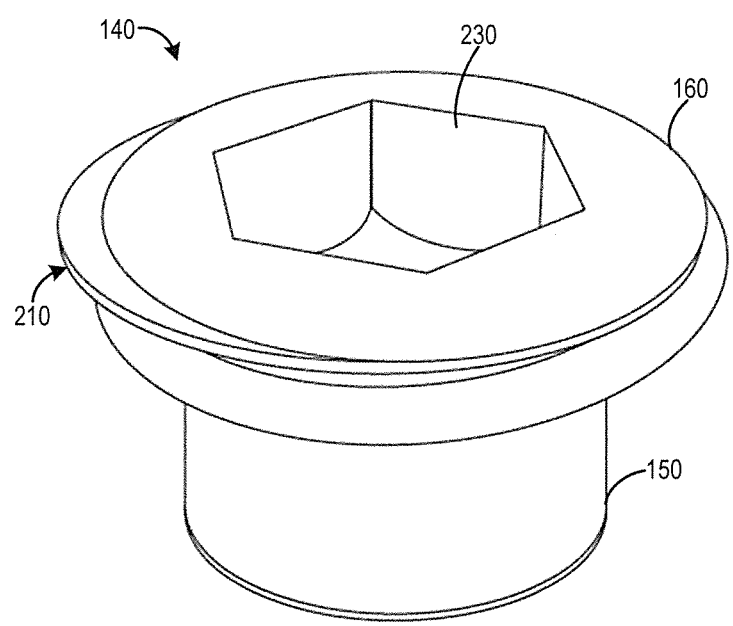
FIG. 11 is a perspective view of an alternative embodiment of a pin for use with the amortisseur systems of FIGS. 7 and 8.

FIGS. 9-11 show alternative embodiments of the pin 140. The head 160, and/or the shaft 150, and/or the amortisseur aperture 180 may have threads 210 thereon such that the pin 140 may be radially locked and removed by torque through the threads 210. Likewise, the pin 140 may have an internal structure such as internal threads 220 as is shown in FIG. 10 or a drive 230 such as a hex drive or a slotted drive as is shown in FIG. 11 for easy removal/disassembly for maintenance. The pin 140 also may have a ribbed, knurled, or raised surface 240 as is also shown in FIG. 10 that acts to interfere with the amortisseur 110 to create an interference fit that locks the components together. Likewise, the aperture 170 may have companion locking features therein. Additionally, the pin 140 may be locked into the amortisseur 110 or the creepage block 114 through an adhesive or epoxy and the like. Additionally, the pin 140 may be located to the amortisseur 110 through a brazing or welding process. Other components and other configurations may be used herein.

By mechanically connecting the amortisseur 110 and the spring 112 to the creepage block 114, part migration may be mitigated without requiring the capability to restrain the massive thermal forces seen in service. Specifically, by affixing the components to the creepage block 114, the source of the forces driving the migration is removed, i.e., relative friction and relative motion between the creepage block 114 and the spring 112 and/or the amortisseur 110.

Additionally, by locating the pin 140 away from the ventilation holes 99, several benefits exist: (1) the pin material need not be made of non-conducting material which allows for higher strength and more readily available parts; (2) the pin 140 may be located in a more accessible location for assembly/disassembly (such as the retaining ring shrink fit position), which makes assembly and disassembly much easier for technician; and (3) external threads 210 or internal threads 220 and the other structures described above may be incorporated to facilitate positive locking and easy removal. Also, this solution allows for reuse of almost all parts (in most cases) and may be implemented by modifying (drilling) the amortisseur 110, the spring 112, and the creepage block 114, and procuring a quickly available and low cost pin 140. Given such, this may be implemented on jobs with short cycle times and at relatively low costs. This solution also may be applied to different model types with minimal redesign efforts.

Although the amortisseur-spring assembly 120 has been described in the context of the combined cycle power generation system 20, the assembly is equally applicable to simple cycle gas turbine generators and the like. Other types of generators also may be used herein.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. An amortisseur-spring assembly for use about at least one of a wedge and a retaining ring of a generator having a ventilation hole extending in a radial direction, comprising:
   an amortisseur;
   a spring;
   a creepage block;
   a locking mechanism extending through the amortisseur and the spring and into but not through the creepage block;
   wherein the locking mechanism is spaced apart from the ventilation hole in an axial direction.

2. The amortisseur-spring assembly of claim 1, wherein the locking mechanism is positioned adjacent to the wedge.

3. The amortisseur-spring assembly of claim 1, wherein the locking mechanism is positioned adjacent to the retaining ring.

4. The amortisseur-spring assembly of clam 1, wherein the locking mechanism comprises a solid pin.

5. The amortisseur-spring assembly of claim 4, wherein the pin comprises a shaft and a head.

6. The amortisseur-spring assembly of claim 5, wherein the shaft comprises a first diameter, wherein the head comprises a second diameter, and wherein the second diameter if greater than the first diameter.

7. The amortisseur-spring assembly of claim 4, wherein the pin comprises external threads.

8. The amortisseur-spring assembly of claim 4, wherein the pin comprises internal threads.

9. The amortisseur-spring assembly of claim 4, wherein the pin comprises a hex drive or a slotted drive.

10. The amortisseur-spring assembly of claim 4, wherein the pin comprises a knurled surface.

11. The amortisseur-spring assembly of claim 1, wherein the amortisseur comprises an amortisseur aperture therethrough.

12. The amortisseur-spring assembly of claim 11, wherein the spring comprises spring aperture therethrough.

13. The amortisseur-spring assembly of claim 12, wherein the creepage bock comprises a creepage block aperture therein.

14. The amortisseur-spring assembly of claim 13, wherein the amortisseur aperture is larger than the spring aperture and the creepage block aperture.

15. A method of installing an amortisseur-spring assembly in a generator, comprising:
   creating an aperture through an amortisseur and a spring and into but not through a creepage block of the amortisseur-spring assembly;
   inserting a locking mechanism in the aperture; and
   positioning the amortisseur-spring assembly adjacent to at least one of a wedge and a retaining ring of the generator.

16. An amortisseur-spring assembly for use about at least one of a wedge and a retaining ring of a generator having a ventilation hole extending in a radial direction, comprising:
   an amortisseur;
   a spring;
   a creepage block; and
   a pin extending through the amortisseur and the spring and into but not through the creepage block;
   wherein the pin is positioned adjacent to the wedge or the retaining ring and spaced apart from the ventilation hole in an axial direction.

17. The amortisseur-spring assembly of claim 16, wherein the pin comprises a shaft and a head.

18. The amortisseur-spring assembly of claim 16, wherein the pin comprises external threads, internal threads, a hex drive, or a knurled surface.

19. The amortisseur-spring assembly of claim 16, wherein the amortisseur comprises an amortisseur aperture therethrough, wherein the spring comprises a spring aperture therethrough, and wherein the creepage bock comprises a creepage block aperture therein.

20. The amortisseur-spring assembly of claim 19, wherein the amortisseur aperture is larger than the spring aperture and the creepage block aperture.

\* \* \* \* \*